(12) United States Patent
Liu et al.

(10) Patent No.: US 6,565,466 B2
(45) Date of Patent: May 20, 2003

(54) BICYCLE DERAILLEUR GEARSHIFT POSITION INDICATOR

(75) Inventors: Wen-Ching Liu, Taichung Hsien (TW); Yu-Chen Chen, Taichung Hsien (TW)

(73) Assignee: Falcon Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 09/791,785

(22) Filed: Feb. 26, 2001

(65) Prior Publication Data

US 2002/0119847 A1 Aug. 29, 2002

(51) Int. Cl.[7] .................. G01D 13/00; F16C 1/10; F16H 63/00
(52) U.S. Cl. .................. 474/80; 474/82; 74/502.2; 116/28.1
(58) Field of Search .................. 474/70, 81, 82, 474/78, 79, 80; 74/502.2, 504, 489, 501.5 R, 473.14, 471 XY, 506, 502.4, 473.13; 340/432, 688, 456, 461; 116/28.1, 281, 321, 323, 324

(56) References Cited

U.S. PATENT DOCUMENTS

| 4,198,873 A | * | 4/1980 | Nagano et al. ............... 474/82 |
| 4,953,493 A | * | 9/1990 | Richmond .................. 116/28.1 |
| 5,178,033 A | * | 1/1993 | Kund ......................... 116/28.1 |
| 5,588,331 A | * | 12/1996 | Huang et al. ............ 74/473.13 |
| 5,799,541 A | * | 9/1998 | Arbeiter .................... 74/502.2 |
| 5,881,602 A | * | 3/1999 | Cirami ................. 74/471 XY |

\* cited by examiner

*Primary Examiner*—Marcus Charles
(74) *Attorney, Agent, or Firm*—Browdy and Neimark

(57) ABSTRACT

A bicycle derailleur gearshift position indicator includes a housing holding a gearshift position indication member, the gearshift position indication member having indication plates corresponding to the gearshift positions of the derailleur system of the bicycle and a view window through which the bicycle rider views the indication of the gearshift position indication member, and a cable take-up wheel suspended below the housing and rotated with the shifters of the derailleur system to move the indication plates of the gearshift position indication member.

6 Claims, 4 Drawing Sheets

BICYCLE DERAILLEUR GEARSHIFT POSITION INDICATOR

BACKGROUND OF THE INVENTION

The present invention relates to bicycles and, more specifically, to a bicycle derailleur gearshift position indicator.

A derailleur is a multiple-speed gear mechanism on a bicycle that involves the moving of the chain from one sprocket to another. Conventional bicycle derailleur systems have no indicator means to indicate the gearshift position. Therefore, the bicycle rider can only judge the current gearshift position by experience subject to the resisting force received from the pedals. This gearshift position judging method is less reliable.

SUMMARY OF THE INVENTION

The present invention has been accomplished under the circumstances in view. It is the main object of the present invention to provide a bicycle derailleur gearshift position indicator, which automatically indicates the gearshift position of the derailleur system when the rider of the bicycle operates the derailleur system. A bicycle derailleur gearshift position indicator according to the present invention comprises a cable take-up wheel rotated with the derailleur cable of the derailleur system of a bicycle subject to the gearshift position of the derailleur system, the cable take-up wheel comprising a recessed receiving portion and a push wall disposed in the recessed receiving portion; a gearshift position indication member, the gearshift position indication member comprising a plurality of indication plates arranged in parallel corresponding to the number of gearshift positions of the derailleur system of the bicycle, the indication plates each having a bottom protruded block respectively supported in the recessed receiving portion of the cable take-up wheel and a top indication face; and a housing, the housing comprising a receiving chamber, which receives the gearshift position indication member, and a view window through which the rider of the bicycle views the indication face of the indication plates of the gearshift position indication member. When the cable take-up wheel is rotated upon operation of the derailleur system by the rider of the bicycle, the push wall of the cable take-up wheel is moved with the cable take-up wheel to push the indication plates of the gearshift position indication member one after another, enabling the rider of the bicycle to view the position change of the indication plates indicative of the position change of the gearshift position of the derailleur system of the bicycle.

DETAILED DESCRIPTION OF THE PREFERRED EMBODIMENT

Referring to FIGS. from 1 through 3, a bicycle derailleur gearshift position indicator is used in a bicycle and adapted to indicate the engagement position between the drive chain and the gears of the derailleur, comprised of a cable take-up wheel 10, a gearshift position indication member 20, and a housing 30.

Figure 1:
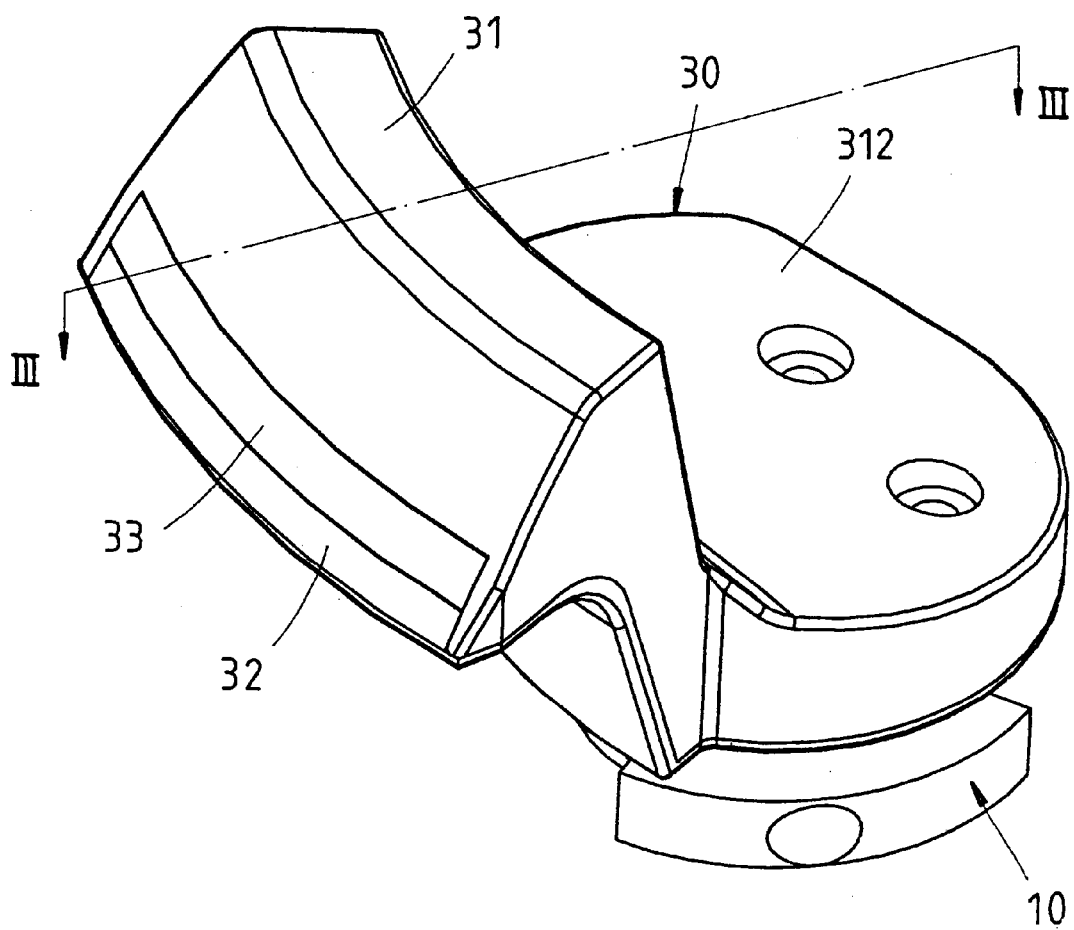
FIG. 1 is an elevational view of a bicycle derailleur gearshift position indicator according to the present invention.
Figure 2:
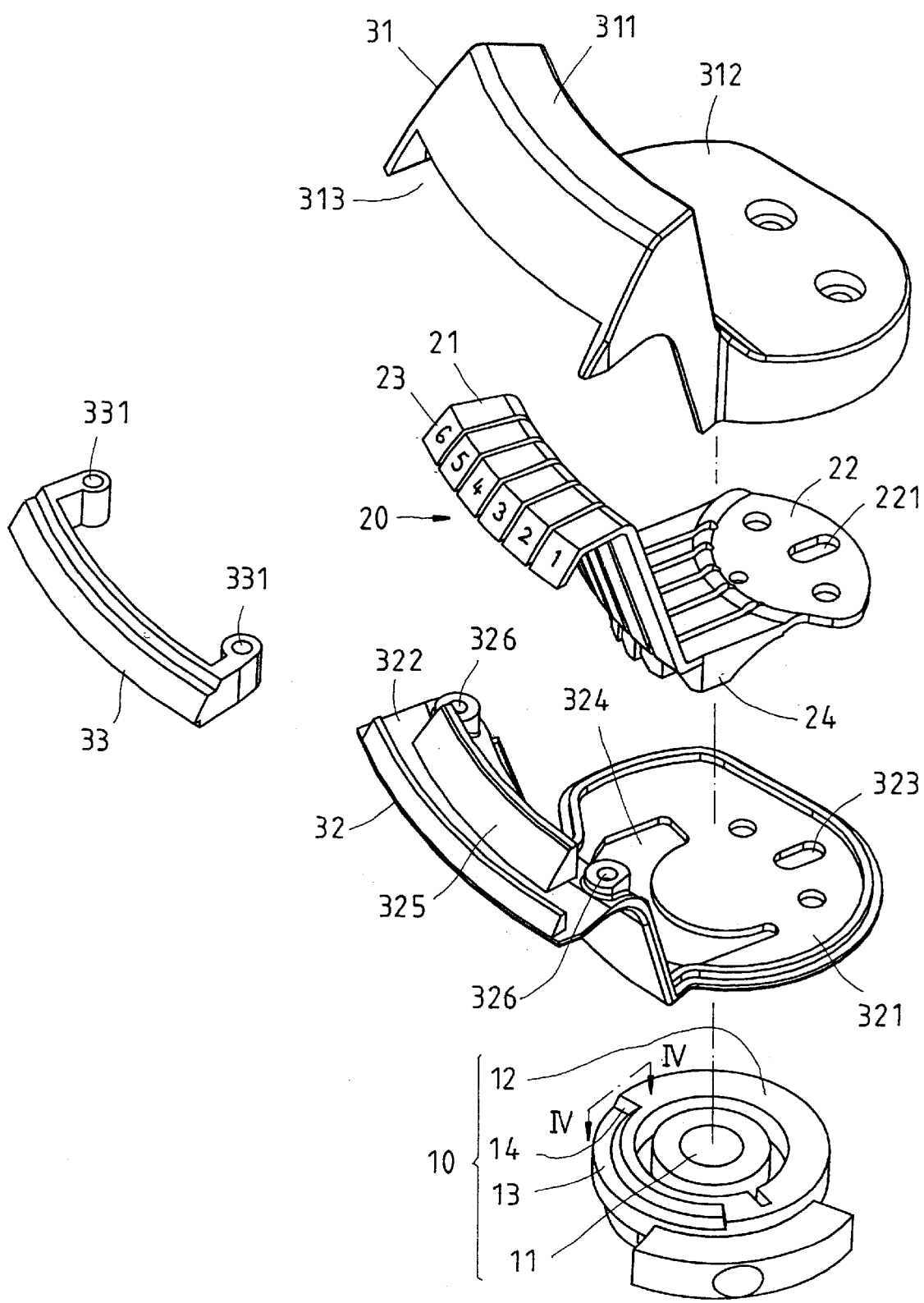
FIG. 2 is an exploded view of the bicycle derailleur gearshift position indicator according to the present invention.
Figures 3, 4:
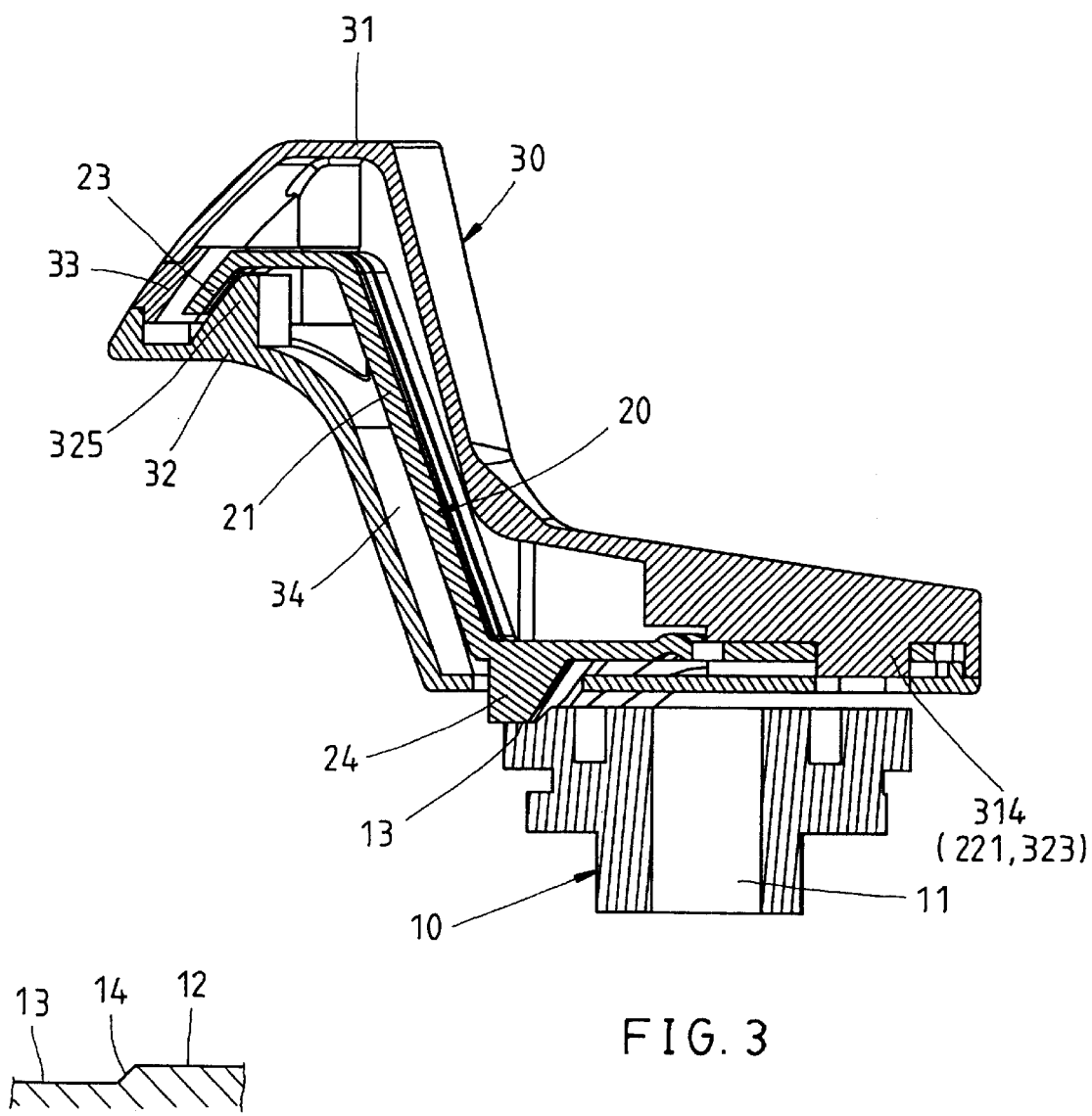
FIG. 3 is a sectional view taken along line III—III of FIG. 1.
FIG. 4 is a sectional view in an enlarged scale taken along line IV—IV of FIG. 2.

The cable take-up wheel 10 comprises a pivot hole 11, which is coupled to a pivot on the shell of the derailleur system (not shown) for enabling the cable take-up wheel 10 to be turned about the pivot subject to the operation of the shifters (not shown), a top sidewall 12, a recessed receiving portion 13 at the top sidewall 12, a sloping push wall 14 obliquely upwardly extended from one end of the recessed receiving portion 13 (see also FIG. 4).

The gearshift position indication member 20 comprises a base panel 22 and a plurality of indication plates 21. The base panel 22 comprises an oblong locating hole 221. The indication plates 21 are narrow, elongated, springy, substantially L-shaped plates arranged in parallel, each having a bottom end respectively connected to the base plate 21 and a top end terminating in an indication face 23 marked with a respective numerical sign (1, 2, 3 . . . ) for indicating different gearshift positions. The indication face 23 of each indication plate 21 may be colored with a respective particular color for indication. Further, each indication plate 21 has a protruded block 24 at the bottom side.

The housing 30 is a part of the derailleur system disposed above the top side of the cable take-up wheel 10, comprised of a top cover shell 31, a bottom cover shell 32, and a transparent shield 33. The top cover shell 31 and the bottom cover shell 32 are fixedly fastened together, defining a receiving chamber 34, which receives the gearshift position indication member 20. The top cover shell 31 is an opaque member comprises a cover base 312, a locating block 314 downwardly extended from the cover base 312, and an extension cover wall 311 obliquely upwardly extended from the periphery of the cover base 312 at one side. The extension cover wall 311 has an elongated front opening 313.

The bottom cover shell 32 comprises a base panel 321, an extension cover wall 322 obliquely upwardly extended from the periphery of the base panel 321 at one side, an oblong locating hole 323 and an arched slot 324 disposed through the base panel 321, a stop block 325 disposed at the top side of the extension cover wall 322, and two pin holders 326 disposed at two sides of the stop block 325.

When covering the top cover shell 31 on the bottom cover shell 322, the base panel 22 of the gearshift position indication member 20 is supported on the base panel 321 of the bottom cover shell 32 with the protruded blocks 24 of the indication plates 21 respectively engaged into the arched slot 324 of the base panel 321 of the bottom cover shell 32 and the recessed receiving portion 13 of the cable take-up wheel 10, and the locating block 314 of the top cover shell 31 is plugged into the oblong locating hole 221 of the gearshift position indication member 20 and the oblong locating hole 323 of the bottom cover shell 32 to hold down the gearshift position indication member 20, preventing the gearshift position indication member 20 from rotation. When assembled, the indication face 23 of each indication plate 21 of the gearshift position indication member 20 is respectively supported on the stop block 325 of the bottom cover shell 32.

The transparent shield 33 is supported between the extension cover wall 311 of the top cover shell 31 and the extension cover wall 322 of the bottom cover shell 32 and covered over the front opening 313 of the top cover shell 31 to use as a view window, having two through holes 331 disposed at two distal ends thereof and respectively connected to the pin holes 326 of the bottom cover shell 32 by a respective pin (not shown).

Figure 5:
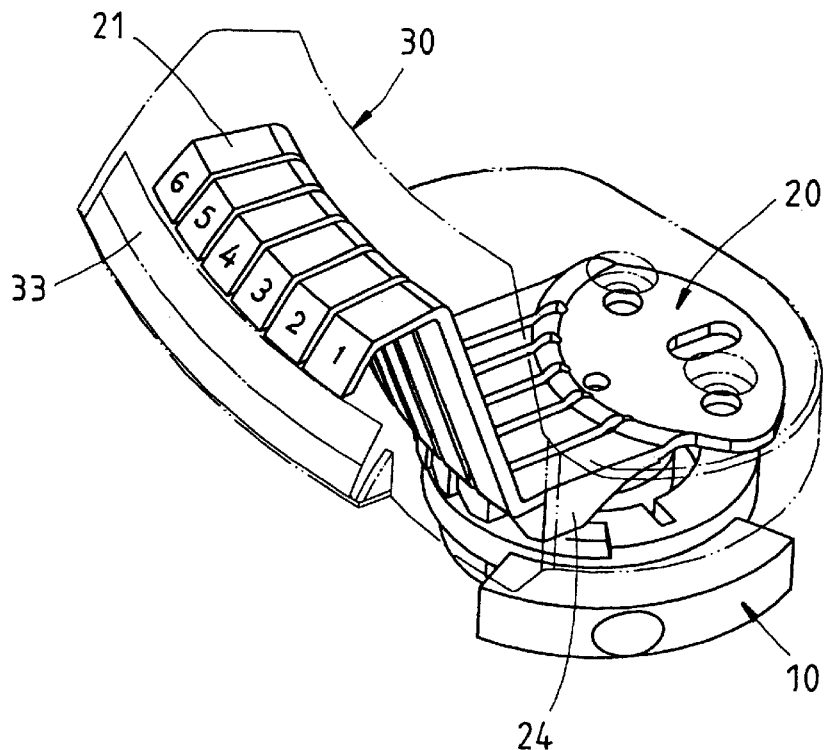
FIG. 5 shows the status of the gearshift position indication member before the operation of the bicycle derailleur system according to the present invention.

Referring to FIG. 5, when the derailleur of the bicycle does no work, the protruded blocks 24 of the indication plates 21 of the gearshift indication member 20 are received in the recessed receiving portion 13 of the cable take-up wheel 10 and supported on the stop block 325 of the bottom cover shell 32. At this time, the bicycle rider can see the indication face 23 of every indication plate 21 through the transparent shield 33.

Figure 6:
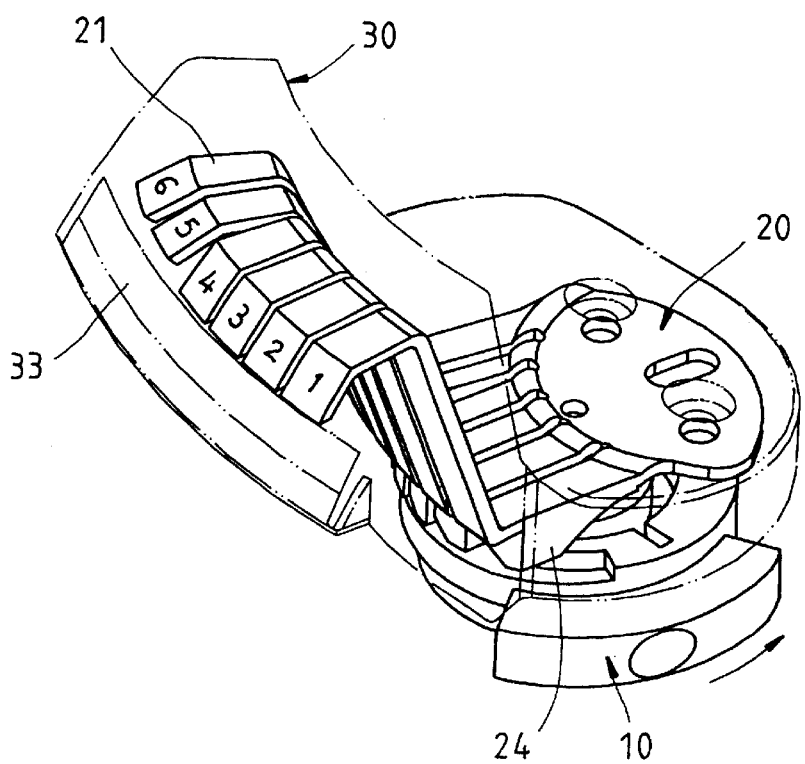
FIG. 6 shows a position change status of the gearshift position indication member upon an operation of the bicycle derailleur system according to the present invention.

Referring to FIG. 6, when the bicycle rider operates the shifters to change the gearshift position during riding, the cable take-up wheel 10 is rotated with the shifters, and the sloping push wall 14 is moved with the cable take-up wheel 10 to push the protruded block 24 of each indication plate 21 from the recessed receiving portion 13 to the higher top sidewall 12, and thus the indication face 23 of each indication plate 21 been pushed by the sloping push wall 14 is moved to the inside of the extension cover wall 311 of the top cover shell 31 and kept from sight. On the contrary, when the bicycle rider reverses the shifters, the cable take-up wheel 10 is rotated in the reversed direction, enabling every pushed indication plate 21 to return to its former position by means of the effect of its material springy power. Therefore, a respective indication is viewed through the transparent shield 33 when the bicycle rider changes the gearshift position during riding.

While only one embodiment of the present invention has been shown and described, it will be understood that various modifications and changes could be made thereunto without departing from the spirit and scope of the invention disclosed.

What the invention claimed is:

1. A bicycle derailleur gearshift position indicator comprising:
   a cable take-up wheel rotated with a derailleur cable of a derailleur system of a bicycle subject to a gearshift position of the derailleur system, said cable take-up wheel comprising a recessed receiving portion and a push wall disposed in said recessed receiving portion;
   a gearshift position indication member, said gearshift position indication member comprising a plurality of indication plates arranged in parallel corresponding to the number of gearshift positions of the derailleur system of the bicycle, said indication plates each having a bottom protruded block respectively supported in said recessed receiving portion of said cable take-up wheel and a top indication face; and
   a housing, said housing comprising a receiving chamber, which receives said gearshift position indication member, and a view window through which a rider of the bicycle view the indication face of said indication plates of said gearshift position indication member;
   wherein when said cable take-up wheel is rotated upon operation of the derailleur system by the rider of the bicycle, the push wall of said cable take-up wheel is moved with said cable take-up wheel to push said indication plates of said gearshift position indication member one after another, enabling the rider of the bicycle to view the position change of said indication plates indicative of the position change of the gearshift position of the derailleur system of the bicycle.

2. The bicycle derailleur gearshift position indicator of claim 1 wherein said push wall of said cable take-up wheel is a sloping wall disposed in said recessed receiving portion at one side.

3. The bicycle derailleur gearshift position indicator of claim 1 wherein said indication plates of said gearshift position indication member each have a bottom end connected to a periphery of a base panel of said gearshift position indication member and a top end terminating in a respective indication face.

4. The bicycle derailleur gearshift position indicator of claim 1 wherein said housing comprises a bottom cover shell, a top cover shell covered on said bottom cover shell, and a transparent shield supported between said top cover shell and said bottom cover shell at a front side and forming a view window.

5. The bicycle derailleur gearshift position indicator of claim 1 wherein the indication face of each of said indication plates of said gearshift position indication member is marked with a respective numerical sign corresponding to a respective gearshift position of the derailleur system of the bicycle.

6. The bicycle derailleur gearshift position indicator of claim 1 wherein the indication face of each of said indication plates of said gearshift position indication member is colored with a respective indicative of a respective gearshift position of the derailleur system of the bicycle.

* * * * *